(12) United States Patent
Singer et al.

(10) Patent No.: US 9,510,169 B2
(45) Date of Patent: Nov. 29, 2016

(54) MOBILE USER INFORMATION SELECTION AND DELIVERY EVENT BASED UPON CREDENTIALS AND VARIABLES

(71) Applicant: TELECOMMUNICATION SYSTEMS, INC., Annapolis, MD (US)

(72) Inventors: Andrew Singer, Seattle, WA (US); Donald Le Roy Mitchell, Bellevue, WA (US); Firdaus Aryana, Seattle, WA (US)

(73) Assignee: Telecommunications Systems, Inc., Annapolis, MD (US)

( * ) Notice: Subject to any disclaimer, the term of this patent is extended or adjusted under 35 U.S.C. 154(b) by 261 days.

(21) Appl. No.: 13/683,394

(22) Filed: Nov. 21, 2012

(65) Prior Publication Data

US 2013/0128776 A1   May 23, 2013

Related U.S. Application Data

(60) Provisional application No. 61/563,207, filed on Nov. 23, 2011.

(51) Int. Cl.
*H04W 4/16* (2009.01)
*H04W 4/22* (2009.01)

(52) U.S. Cl.
CPC ............ *H04W 4/16* (2013.01); *H04W 4/22* (2013.01)

(58) Field of Classification Search
CPC ..... H04L 67/30; H04L 76/306; H04L 67/22; H04L 67/303; H04L 29/12094; H04L 65/1006; H04W 4/12; H04W 4/14; H04W 4/22; H04W 8/18; H04W 4/16; H04W 4/18; H04W 28/14
USPC ............ 370/259; 455/404.2, 404.1, 466; 709/206, 203, 223, 250; 379/265.02
See application file for complete search history.

(56) References Cited

U.S. PATENT DOCUMENTS

| 4,625,081 A | 11/1986 | Lotito |
| 5,611,050 A | 3/1997 | Theimer |

(Continued)

FOREIGN PATENT DOCUMENTS

| DE | WO/2004021726 | 3/2004 |
| WO | WO/03039009 | 5/2003 |

(Continued)

OTHER PUBLICATIONS

International Search Report received in PCT/US2012/067857 dated Feb. 20, 2013.

(Continued)

*Primary Examiner* — Kwang B Yao
*Assistant Examiner* — Syed M Bokhari
(74) *Attorney, Agent, or Firm* — Tarolli, Sundheim, Covell & Tummino LLP (57) ABSTRACT

Dynamically selecting and facilitating stored caller information to a communications recipient device with a communications event, based on communication recipient credentials (e.g. IP address, MDN, etc.), preferences outlined in a subscriber profile associated with a relevant calling device, and other variables, e.g., time of day, location of calling device, etc. A subscriber is permitted to provision subscriber preferences and subscriber information associated with users of a subscribing communications device in to a subscriber profile, for use during a communications event. Subscriber preferences are defined to place restrictive conditions on stored subscriber information that may be transmitted with a communications event initiated by a corresponding communications device. A content collection node dynamically selects customized caller information via a subscriber information content collection process. Customized caller information is transmitted to appropriate recipient devices with a corresponding communication event.

19 Claims, 3 Drawing Sheets

(56) References Cited

U.S. PATENT DOCUMENTS

| | | |
|---|---|---|
| 5,712,900 A | 1/1998 | Maupin |
| 5,937,344 A | 8/1999 | Zicker |
| 6,067,045 A | 5/2000 | Castelloe |
| 6,121,923 A | 9/2000 | King |
| 6,195,555 B1 | 2/2001 | Dent |
| 6,275,937 B1 | 8/2001 | Hailpern |
| 6,397,074 B1 | 5/2002 | Pihl |
| 6,438,223 B1 | 8/2002 | Eskafi |
| 6,535,743 B1 | 3/2003 | Kennedy, III |
| 6,556,816 B1 | 4/2003 | Gafrick |
| 6,675,017 B1 | 1/2004 | Zellner |
| 6,721,396 B2 | 4/2004 | Chin |
| 6,771,742 B2 | 8/2004 | McCalmont |
| 6,813,499 B2 | 11/2004 | McDonnell |
| 6,865,266 B1 | 3/2005 | Pershan |
| 6,925,504 B1 | 8/2005 | Liskov |
| 7,031,724 B2 | 4/2006 | Ross |
| 7,194,249 B2 | 3/2007 | Phillips |
| 7,516,198 B1 | 4/2009 | Appala |
| 7,526,563 B2 | 4/2009 | Ingimundarson |
| 7,617,287 B2 | 11/2009 | Vella |
| 7,627,331 B2 | 12/2009 | Winterbottom |
| 7,684,782 B2 | 3/2010 | Ashley |
| 7,730,216 B1 * | 6/2010 | Issa et al. ............. 709/250 |
| 7,822,391 B1 | 10/2010 | Delker |
| 7,895,263 B1 | 2/2011 | Kirchmeier |
| 8,291,011 B2 * | 10/2012 | Abu-Hakima et al. ....... 709/203 |
| 2002/0002036 A1 | 1/2002 | Uehara |
| 2002/0055924 A1 | 5/2002 | Liming |
| 2002/0086659 A1 | 7/2002 | Lauper |
| 2002/0099802 A1 | 7/2002 | Marsh |
| 2002/0111159 A1 | 8/2002 | Faccin |
| 2002/0113797 A1 | 8/2002 | Potter |
| 2002/0136364 A1 | 9/2002 | Stumer |
| 2002/0141386 A1 | 10/2002 | Minert |
| 2002/0154221 A1 | 10/2002 | Ishimaru |
| 2002/0174073 A1 | 11/2002 | Nordman |
| 2003/0063714 A1 | 4/2003 | Stumer |
| 2003/0063730 A1 | 4/2003 | Woodring |
| 2003/0069002 A1 | 4/2003 | Hunter |
| 2003/0081752 A1 | 5/2003 | Trandal |
| 2003/0081754 A1 | 5/2003 | Esparza |
| 2003/0115261 A1 | 6/2003 | Mohammed |
| 2003/0125021 A1 | 7/2003 | Tell |
| 2003/0135493 A1 | 7/2003 | Phelan |
| 2003/0163483 A1 | 8/2003 | Zingher |
| 2003/0186709 A1 | 10/2003 | Rhodes |
| 2003/0187803 A1 | 10/2003 | Pitt |
| 2003/0222901 A1 | 12/2003 | Houck |
| 2004/0064500 A1 | 4/2004 | Kolar et al. |
| 2004/0070515 A1 | 4/2004 | Burkley |
| 2004/0093217 A1 | 5/2004 | Yeh |
| 2004/0107143 A1 | 6/2004 | Niemi |
| 2004/0150518 A1 | 8/2004 | Phillips |
| 2004/0152493 A1 | 8/2004 | Phillips |
| 2004/0156394 A1 | 8/2004 | Westman |
| 2004/0157175 A1 | 8/2004 | Matsumoto |
| 2004/0184584 A1 | 9/2004 | McCalmont |
| 2004/0190497 A1 | 9/2004 | Knox |
| 2004/0203568 A1 | 10/2004 | Kirtland |
| 2004/0203876 A1 | 10/2004 | Drawert |
| 2004/0203919 A1 | 10/2004 | Ross |
| 2004/0242191 A1 | 12/2004 | Hossain |
| 2004/0247090 A1 | 12/2004 | Nurmela |
| 2005/0003797 A1 | 1/2005 | Baldwin |
| 2005/0030977 A1 | 2/2005 | Casey |
| 2005/0031095 A1 | 2/2005 | Pietrowicz |
| 2005/0039135 A1 | 2/2005 | Othmer |
| 2005/0047399 A1 | 3/2005 | Lee |
| 2005/0144322 A1 | 6/2005 | Miyajima |
| 2005/0148346 A1 | 7/2005 | Maloney |
| 2005/0148353 A1 | 7/2005 | Hicks, III |
| 2005/0181805 A1 | 8/2005 | Gallagher |
| 2005/0186948 A1 | 8/2005 | Gallagher |
| 2005/0188078 A1 | 8/2005 | Kotzin |
| 2005/0190892 A1 | 9/2005 | Dawson |
| 2005/0195954 A1 | 9/2005 | Klein |
| 2005/0202799 A1 | 9/2005 | Rollender |
| 2005/0213537 A1 | 9/2005 | Ingimundarson et al. |
| 2005/0272424 A1 | 12/2005 | Gallagher |
| 2005/0272449 A1 | 12/2005 | Gallagher |
| 2005/0287979 A1 | 12/2005 | Rollender |
| 2006/0044407 A1 | 3/2006 | Barbeau |
| 2006/0073812 A1 | 4/2006 | Punaganti |
| 2006/0079236 A1 | 4/2006 | Del Pino et al. |
| 2006/0099935 A1 | 5/2006 | Gallagher |
| 2006/0135177 A1 | 6/2006 | Winterbottom |
| 2006/0154665 A1 | 7/2006 | Svensson |
| 2006/0184617 A1 | 8/2006 | Nicholas |
| 2006/0189303 A1 | 8/2006 | Rollender |
| 2006/0205383 A1 | 9/2006 | Rollender |
| 2006/0236258 A1 | 10/2006 | Othmer |
| 2006/0293024 A1 | 12/2006 | Benco |
| 2007/0008885 A1 | 1/2007 | Bonner |
| 2007/0027997 A1 | 2/2007 | Polk |
| 2007/0060097 A1 | 3/2007 | Edge |
| 2007/0104183 A1 | 5/2007 | Bakke |
| 2007/0190968 A1 | 8/2007 | Dickinson |
| 2007/0201623 A1 | 8/2007 | Hines |
| 2007/0202844 A1 | 8/2007 | Wilson |
| 2007/0218871 A1 | 9/2007 | Bonner |
| 2007/0238448 A1 | 10/2007 | Gallagher et al. |
| 2008/0045250 A1 | 2/2008 | Hwang |
| 2008/0080488 A1 | 4/2008 | Marsico |
| 2008/0188198 A1 * | 8/2008 | Patel ............... G06F 21/6245 455/404.2 |
| 2008/0192731 A1 | 8/2008 | Dickinson |
| 2008/0261636 A1 * | 10/2008 | Lau ................ G06F 11/3013 455/466 |
| 2008/0268809 A1 | 10/2008 | Busin |
| 2009/0237210 A1 | 9/2009 | Ciesla |
| 2010/0021013 A1 | 1/2010 | Gale |
| 2010/0233991 A1 * | 9/2010 | Crawford ............ H04L 45/00 455/404.1 |
| 2010/0262668 A1 | 10/2010 | Piett |
| 2011/0137549 A1 | 6/2011 | Gupta |
| 2011/0151837 A1 | 6/2011 | Winbush |
| 2011/0207429 A1 | 8/2011 | Maier |
| 2012/0084371 A1 * | 4/2012 | Rajagopalan ....... H04L 41/5054 709/206 |
| 2012/0258680 A1 * | 10/2012 | Piett .................. H04W 76/007 455/404.1 |
| 2013/0051546 A1 * | 2/2013 | Fried ................. H04M 3/5231 379/265.02 |
| 2013/0095783 A1 * | 4/2013 | Mahdi .................... 455/404.2 |
| 2013/0246595 A1 * | 9/2013 | O'Donoghue ........... G06N 5/02 709/223 |

FOREIGN PATENT DOCUMENTS

| | | |
|---|---|---|
| WO | WO/2005060292 | 6/2005 |
| WO | WO2007/025227 | 3/2007 |
| WO | WO2009/105603 | 8/2009 |

OTHER PUBLICATIONS

International Search Report received in PCT/US2012/67689 dated Feb. 22, 2013.

International Search Report received in PCT/US2012/067932 dated Feb. 6, 2013.

Winterbottom et al., Geopriv PIDF-LO Usage Clarification, Considerations and Recommendations, Geopriv, Feb. 12, 2005, pp. 1-19.

PCT Notification of Transmittal of the International Search Report and the Written Opinion of the International Searching Authority received in PCTUS2007/00039, Feb. 14, 2008.

Peterson et al., "A Presence-Based Geopriv Location Object Format; rfc4119,txt," Neustar, Dec. 1, 2005, pp. 1-23.

Winterbottom, et al., "Geopriv PIDF-Lo Usage Clarification, Considerations and Recommendations; draft-ietf-geopriv-pdif-lo-profile-00.txt," Nortel, Jul. 2, 2005, pp. 1-31.

(56) References Cited

OTHER PUBLICATIONS

Berners-Lee, et al., "Uniform Resource Identifier (URI) Generic Standard, Internet Engineering Task Force," Day Software, Jan. 1, 2005, pp. 1-61.
European Search Report in Appl. No. EP07 71 6216 dated Dec. 12, 2009.
Zehua et al., "On Querying Geospatial and Georeferenced Metadata Resources in G-Portal," IEEE Comp. SOC, May 31, 2003, pp. 245-255.
http://en.wikipedia.org/wiki/imsi, Wikipedia Encyclopedia, International Mobile Subscriber Identity, pp. 1-4, printed on Sep. 4, 2008.
PCT Notification of Transmittal of the International Search Report and the Written Opinion of the International Searching Authority received in PCTUS2006/27658, Feb. 13, 2007.
International Search Report received in PCT/US2012/066313 dated Feb. 4, 2013.
International Preliminary Report on Patentability received in PCT/US2012/066313 dated Oct. 21, 2013.

\* cited by examiner

FIG. 1

| CONTENT QUERY | | TOD: 6:01 PM | |
|---|---|---|---|
| SOURCE: 210 | LOCATION OF SOURCE: | RECIPIENT: | LOCATION OF RECIPIENT: |
| 6097775945 | 38° 53' 23N / 77° 00' 27" W 220 | 7322416600 240 | 34° 41' 00"N / 65° 22' 41" W |
| | | 7568476655 260 | 32° 33' 11"N / 71° 25' 66" W 250 |

| MIN: 4445102222 ~332 | | 334 | | 336 |
|---|---|---|---|---|
| IDENTIFICATION CREDENTIALS ~314 | : | NAME | | AGE |
| | | JANE DOE ~316 | | 37 ~318 |
| HEALTH PROFILE ~320 | : | CONDITIONS | | MEDICATIONS |
| | | ASTHMA | | INSULIN |
| | | DIABETES ~322 | | |
| EMERGENCY CONTACT ~308 | : | IDENTIFIER | | NAME / RELATION |
| | | 6092241111 | | LYNN / MOM |
| | | 4425412712310 ~310 | | SAM / SISTER ~312 |
| POTENTIAL LOCATION SET ~304 | : | IDENTIFIER | | ADDRESS |
| | | HOME | | 1 PARKWAY, CHEVY CHASE MD, 20815 |
| | | WORK | | 2 MAIN ST. MCLEAN, VA 22181 |
| | | VACATION HOME | | 14 PARADISE IS. SAN DIEGO, CA. 20000, APT.#4 |
| CONTACT LIST | : | (ACCESS PARAMETERS) ~326 | 328 ~ | 330 ~ : |
| IDENT ~306a | NAME / RELATION | INFO ACCESS | TOD | (LOCATION PARAMETERS) ... |
| 6095551212 | BOB / DAD | LOCATION | 8 AM – 6 PM | WITHIN 5 MIN. RADIUS OF SOURCE |
| ~306b | | HEALTH PROF. | ANY | ANY |
| | | IDENTIFICATION | ANY | ANY |
| 911 | EMERGENCY DISPATCH PERSONNEL | LOCATION | ANY | WITHIN 5 MIN. RADIUS OF SOURCE |
| | | IDENTIFICATION | ANY | ANY |

Table 300 (with ~302 identifier); (ACCESS PARAMETERS) ~324

FIG. 3

MOBILE USER INFORMATION SELECTION AND DELIVERY EVENT BASED UPON CREDENTIALS AND VARIABLES

The present invention claims priority from U.S. Provisional Application No. 61/563,607 to Andrew SINGER, Donald Le Roy MITCHELL, Jr. and Firdaus ARYANA, entitled "Mobile Subscriber Information Preparation and Delivery During A Communications Event Based Upon Credentials and Variables" filed Nov. 23, 2011, the entirety of which is expressly incorporated herein by reference.

BACKGROUND OF THE INVENTION

1. Field of the Invention

This invention relates generally to mobile communication devices. More particularly, it relates to wireless communications, including location, messaging, and public safety applications.

2. Background of Related Art

In the current state of technology, a data store (i.e. a data repository) and a signaling method are used in combination to transmit caller information (e.g. a callback number, user name, etc.) from a calling device to a recipient device with a communications event.

A conventional method of complementing a communications event with additional caller information comprises initiating a communications event between a calling device and a recipient device, compiling additional caller information into a signaling message at the calling device, and then routing the signaling message from the calling device to the recipient device with the communications event.

Existing technology and methods do not provide a mechanism for a 911 telecommunicator to retrieve a higher fidelity location description after verbal verification from a caller.

SUMMARY OF THE INVENTION

A method and apparatus for dynamically selecting and transmitting stored caller (person, machine, and/or sensor) information to a communications recipient device with a communications event (e.g. a voice over IP call, an SMS message, an IP message, an MMS message, etc.), comprises a content collection node. In accordance with the principles of the present invention, a content collection node facilitates stored subscriber information to a communications recipient device with a communications event, based on: communication recipient credentials (e.g. IP address, Mobile Directory Number, etc.), subscriber preferences defined for a communications calling device, and other relevant variables, e.g., time of day, location of calling device, location of recipient device, etc. A content collection node dynamically collects customized caller information for a communications recipient device via a subscriber information content collection process.

In accordance with the principles of the present invention, a subscriber provisions personal information associated with users of a subscribing communications device in to a subscriber profile via a secure subscriber information provisioning interface. A subscriber profile is then stored in a subscriber information reference database for use during a communications event. In accordance with the principles of the present invention, a subscriber profile preferably contains identification credentials for users of a corresponding communications device, a contact list, a potential location profile, a health profile, an emergency contact list, and subscriber preferences.

In accordance with the principles of the present invention, subscriber preferences are defined for a communications device to place restrictive conditions on stored subscriber information that may be transmitted with a communications event initiated by that communications device. For instance, a communications device may define subscriber preferences to indicate when (e.g. time of day, day of week, etc.) subscriber information may be transmitted with a communications event initiated by that particular communications device. Moreover, a communications device may define subscriber preferences to indicate specific recipient devices (e.g. emergency dispatch personnel) to which subscriber information may be transmitted with a communications event initiated by that particular communications device.

In accordance with the principles of the present invention, furnishing customized caller information with a communications event (e.g. a 911 call) provides a communications recipient device the ability to attain a higher fidelity location description for a communications source device, and/or a higher fidelity emergency description for a communications source device, following verbal verification from a caller.

BRIEF DESCRIPTION OF THE DRAWINGS

Features and advantages of the present invention become apparent to those skilled in the art from the following description with reference to the drawings.

DETAILED DESCRIPTION OF ILLUSTRATIVE EMBODIMENTS

The present invention provides a network element and method for storing subscriber (person, machine, and/or sensor) information for use during a communications event, based on relevant credentials (e.g. communication recipient credentials and/or communication source credentials) and/or variables, e.g., time of day, day of week, etc. In accordance with the principles of the present invention, a communications event may be, e.g., a voice over IP call, an SMS message, an IP message, an MMS message, etc.

Currently, there is no mechanism to permit a calling device to place restrictive conditions on caller information that may be transmitted with a communications event initiated by that calling device. For instance, a calling device cannot articulate specific times at which certain caller information may be relevant (e.g., in the evening when likely at home; during the weekday when likely at work; etc.).

Moreover, there is currently no mechanism to enable a calling device to articulate specific recipient devices to which additional, higher fidelity caller information may be transmitted with a given communications event (e.g., during an emergency call.)

As recognized by the current inventors, a calling device may desire that certain caller information be transmitted to certain specific or type recipient devices in a given communications event, and not transmitted to other specific or type recipient devices in that same given communications event.

For instance, a calling device may desire that a communications system only complement communications events destined to emergency dispatch personnel (e.g. a Public Safety Answering Point) with additional caller information. Moreover, depending on the time of day, a calling device may or may not desire certain caller information to be transmitted to certain recipient devices specified in a communications event.

Consequently, the present inventors have identified a need for a system that references user-defined subscriber preferences to dynamically select and transmit subscriber information pre-provisioned for a calling device, to individual recipient devices specified in a communications event initiated by that calling device.

The present invention facilitates stored caller information to a communications recipient device with a communications event, based on communication recipient credentials (e.g. IP address, Mobile Directory Number, etc.), preferences outlined in a subscriber profile associated with a relevant calling device, and other variables, e.g., time of day, location of calling device, location of recipient device, etc.

In accordance with the principles of the present invention, furnishing customized caller information to a communications recipient device with a communications event (e.g. a 911 call), provides that communications recipient device (e.g. emergency service personnel) the ability to attain a higher fidelity location description for a communications source device, and/or a higher fidelity emergency description for a communications source device, following verbal verification from a caller. Moreover, the present invention enables a communications system to furnish a multiple choice response set (e.g. home address, work address, vacation home address) to a communications recipient device with a communications event, from which the communications recipient device must then select based on information/verbal verification (e.g. "I am at home") provided by a caller.

The present invention permits a subscriber to provision subscriber preferences (i.e. restrictive conditions) and subscriber (person, machine, and/or sensor) information associated with users of a communications device in to a subscriber profile. Subscriber preferences are defined for a communications device to place restrictive conditions on stored subscriber information that may be transmitted to a recipient device with a communications event initiated by that communications device. For instance, subscriber preferences may be defined to identify when (e.g. a time of day, a day of week, etc.) subscriber information may be transmitted with communications events initiated by a particular communications device. Moreover, subscriber preferences may be defined to identify recipient devices (e.g. emergency dispatch personnel) to which caller information may be transmitted with communications events initiated by a particular communications device. In accordance with the principles of the present invention, subscriber preferences are stored in a subscriber information reference database via a secure subscriber information provisioning interface, for use during a communications event.

In accordance with the principles of the present invention, a content collection node references a subscriber profile associated with a calling device to dynamically select and facilitate stored caller information to a communications recipient device with a communications event initiated by that calling device. The content collection node dynamically selects caller information for a communications recipient device based on: communications recipient credentials (e.g. IP address, Mobile Directory Number, etc.), subscriber preferences defined in a subscriber profile for the calling device, and any variables (e.g., time of day, location of recipient device, etc.) relevant to the initiated communications event.

Figure 1:
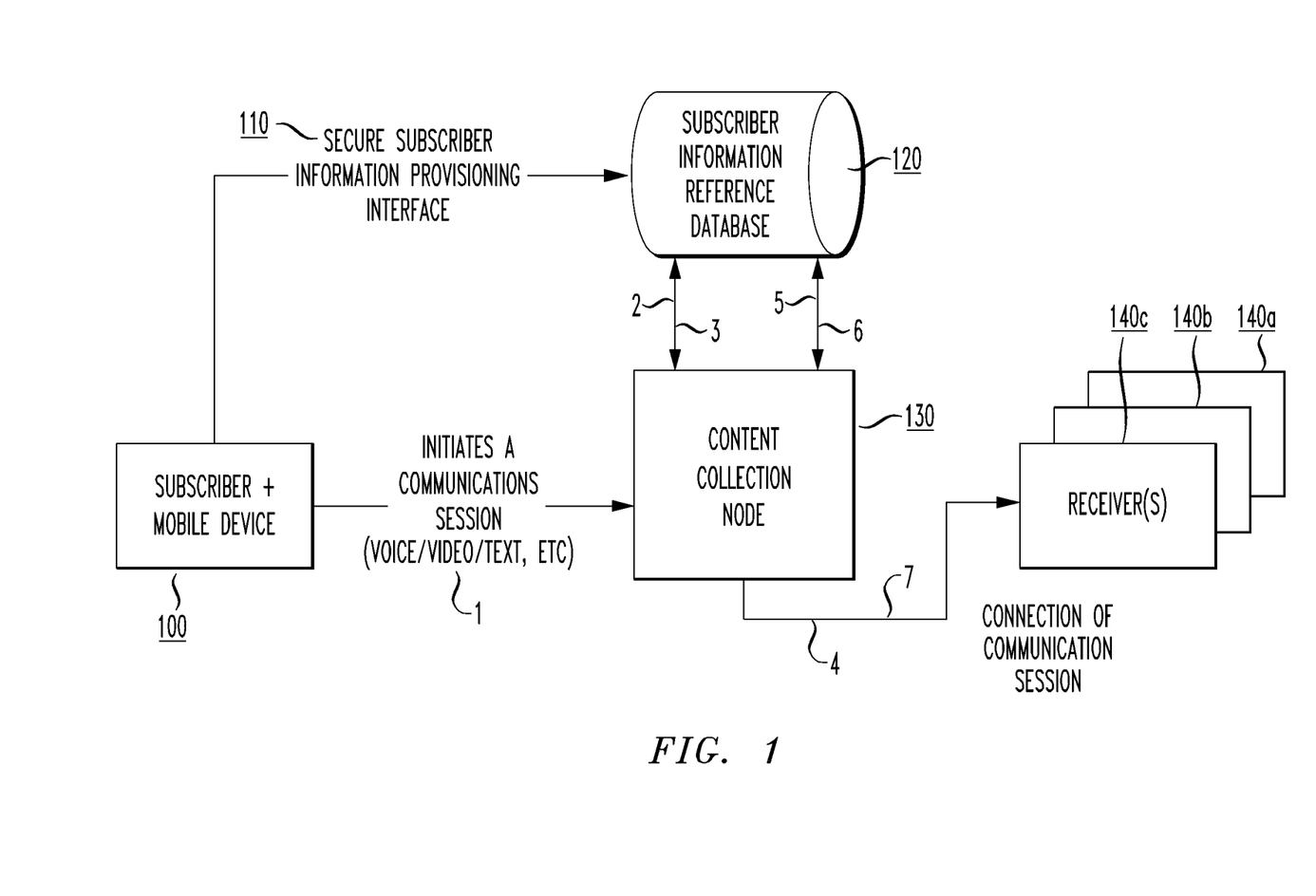
FIG. 1 depicts an exemplary network structure and call flow for dynamically selecting and transmitting caller information associated with a calling device to a communication recipient device with a communications event, in accordance with the principles of the present invention.

FIG. 1 depicts an exemplary network structure for identifying and providing stored caller information to a communications recipient device with a communications event, in accordance with the principles of the present invention.

In particular, a subscriber provisions personal information associated with users of a subscribing communications device 100 in to a subscriber profile via a secure subscriber information provisioning interface 110. A subscriber profile preferably contains identifying data (e.g. name, age, etc.) for users of a corresponding communications device 100, a contact list, a potential location set, a health profile, and user-defined subscriber preferences. Moreover, a subscriber profile may additionally include, e.g., images and/or videos describing information about users of a corresponding communications device 100, additional profiles containing more precise location descriptions for users of a corresponding communications device 100, emergency contact information, etc. A subscriber may access the secure subscriber information provisioning interface 110 to alter/update a subscriber profile at any given time.

In accordance with the principles of the present invention, a subscriber profile provisioned for a communications device 100 is stored in a subscriber information reference database 120 for use during a communications event.

In accordance with the principles of the present invention, subscriber information is dynamically selected for a communications recipient device 140 via a content collection node 130, shown in FIG. 1. In particular, a content collection node 130 initiates a subscriber information content collection process to collect customized caller information for a communications recipient device 140, based on: identification credentials (e.g. IP address, Mobile Directory Number, etc.) corresponding to a particular communications recipient device 140, subscriber preferences articulated in a subscriber profile associated with a communications source device 100, and other relevant variables, e.g., time of day, location of recipient device 140, location of calling device 100, etc. A content collection node 130 only initiates a subscriber information content collection process if one or more recipient devices 140 specified in an initiated communications event is permitted (e.g., by means of a contact list defined in a calling device's 100 subscriber profile) to receive subscriber information pre-provisioned for a relevant calling device 100.

In particular, in accordance with the principles of the present invention, a communications event is first initiated by a subscribing communications device (i.e. a calling device) 100 to one or more communications recipient devices 140, as depicted in step 1 of FIG. 1. The initiated communications event is then forwarded to a content collection node 130 during call routing.

The content collection node 130 receives the communications event initiated in step 1, and retrieves identification credentials for both the calling device (i.e. the subscribing wireless device) 100 specified in the origination field of the communications event, and any recipient devices 140 specified in the destination field. In step 2, the content collection node 130 sends a first query to the subscriber information reference database 120, containing identification credentials specified in the initiated communications event.

The subscriber information reference database 120 receives the first query from the content collection node 130 and uses data contained therein to identify a subscriber profile associated with the communications source device

100. In step 3, the subscriber information reference database 120 sends a first query response to the content collection node 130 to identify which (if any) communications recipient devices (140a, 140b, and/or 140c) are permitted (e.g. by means of a contact list defined in the calling device's 100 subscriber profile) to receive additional caller information with the communications event initiated in step 1.

If no recipient devices 140 are permitted to obtain subscriber information pre-provisioned for the communications source device 100, the content collection node 130 simply forwards the relevant communications event to all communications recipient devices 140 (as depicted in step 4) and call flow is complete.

Alternatively, if any of the one or more recipient devices 140 identified in the communications event are permitted to receive subscriber information pre-provisioned for the communications source device 100, the content collection node 130 initiates a subscriber information content collection process to dynamically collect caller information for appropriate recipient devices (140a, 140b, and/or 140c).

During a subscriber information content collection process, a content collection node 130 collects and compiles various variables, e.g., time of day, day of week, location of calling device 100, location of recipient device 140, location range (a diameter based upon the calling device 100), etc., relevant to the initiated communications event. The content collection node 130 then compiles relevant variables in to a content query and furnishes the content query to the subscriber information reference database 120, as depicted in step 5.

Figure 2:
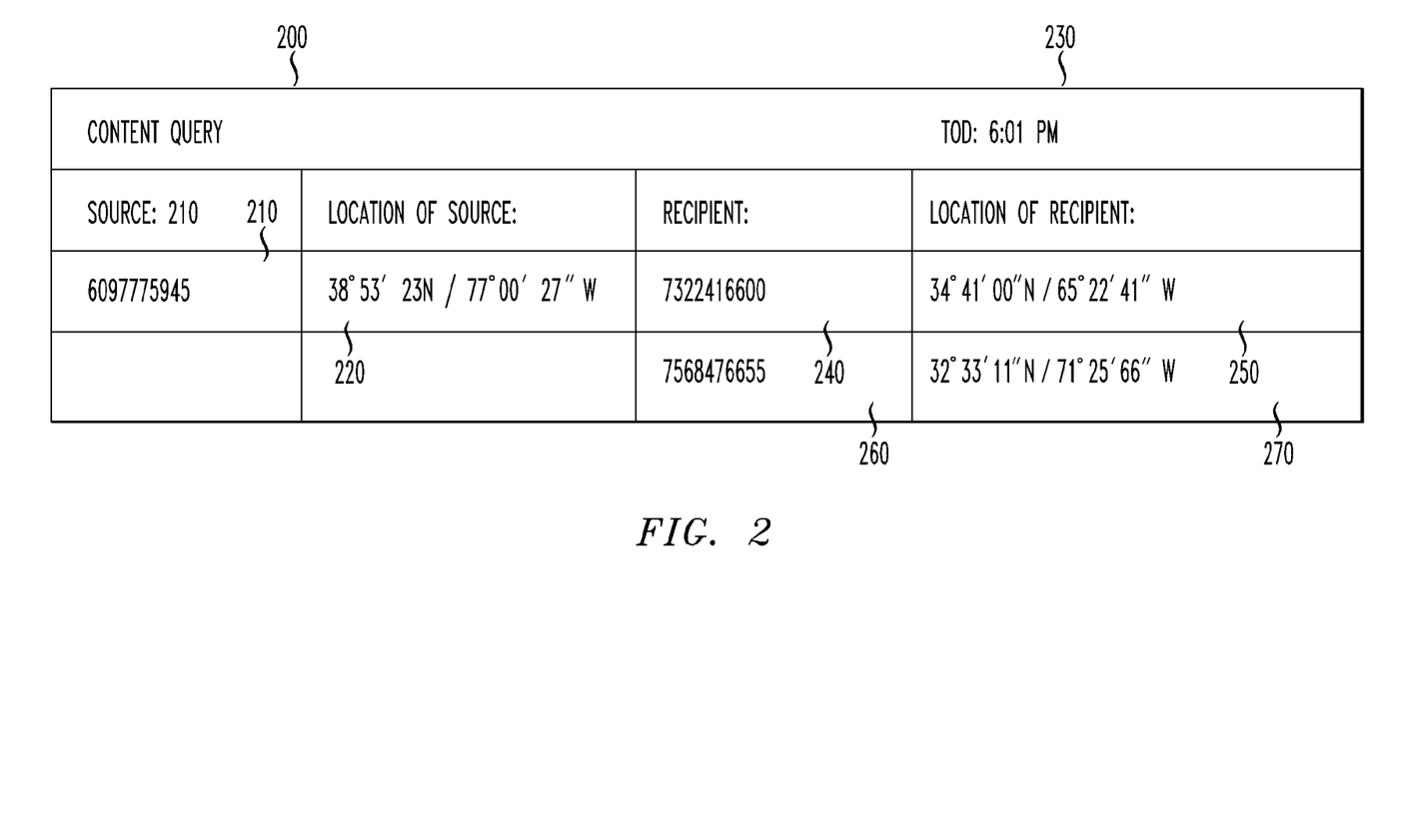
FIG. 2 depicts an illustrative example of a content query, in accordance with the principles of the present invention.

FIG. 2 depicts an illustrative example of a content query, in accordance with the principles of the present invention.

In particular, the content query 200 depicted in FIG. 2 indicates to a subscriber information reference database 120 that a calling device '6097775945' 210, located at lat/lon pair 38°53'23"N/77°00'27"W 220, initiated a communications event at 6:01 PM 230 to a recipient device '7322416600' 240, located at lat/lon pair 34°41'00"N/65°22'41"W 250, and a recipient device '7568476655' 260, located at lat/lon pair 32°33'11"N/71°25'66"W 270.

In step 6 of FIG. 1, the subscriber information reference database 120 receives the content query transmitted in step 5, and uses variables contained therein to return a content query response to the content collection node 130. A content query response contains customized caller information for each communications recipient device (140a, 140b, and/or 140c) permitted to receive caller information pre-provisioned for the communications calling device. Customized caller information is selected based on: communication recipient credentials (e.g. IP address, Mobile Directory Number, etc.), preferences defined in a subscriber profile associated with the calling device 100, and any relevant variables, e.g., time of day, day of week, location of calling device 100, location of recipient device (140a, 140b, or 140c), location range (a diameter based upon the calling device 100), etc., obtained during the subscriber information content collection process.

The content collection node 130 subsequently receives the content query response and uses data contained therein to compose customized caller information messages for each recipient device (140a, 140b, and/or 140c) permitted (e.g. by means of a contact list defined in the calling device's 100 subscriber profile) to receive caller information pre-provisioned for the communications source device 100. Customized caller information messages may be prepared for either automatic or manual retrieval, in accordance with the principles of the present invention.

In step 7, the content collection node 130 forwards the initiated communications event to all recipient devices 140 specified in the communications event destination field, and additionally forwards a customized caller information message to each recipient device (140a, 140b, and/or 140c) permitted (e.g. by means of a contact list defined in the calling device's 100 subscriber profile) to receive caller information therewith.

In accordance with the principles of the present invention, a customized caller information message may be presented automatically to a recipient device 140, or manually following selection by a recipient device 140.

Figure 3:
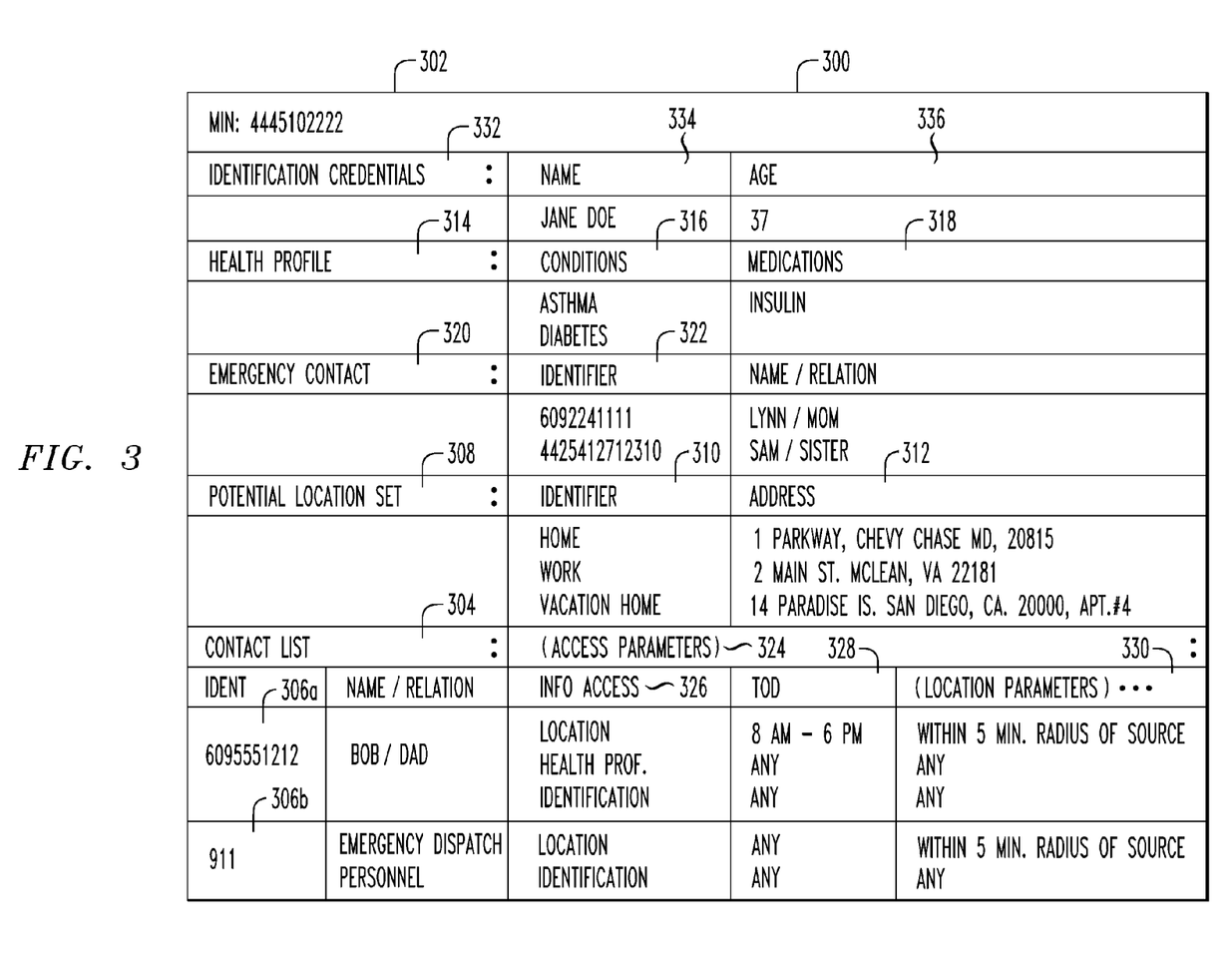
FIG. 3 depicts an illustrative example of a subscriber profile provisioned for a subscribing communication device, in accordance with the principles of the present invention.

FIG. 3 depicts an illustrative example of a subscriber profile provisioned for a subscribing communications device, in accordance with the principles of the present invention.

As depicted in FIG. 3, a subscriber profile 300 preferably contains identification credentials (e.g. name 334, age 336, etc.) 332 for users of a corresponding communications device 302.

In addition, a subscriber profile 300 defined for a subscribing communications device 302 may contain a contact list 304. In accordance with the principles of the present invention, a contact list 304 lists identification credentials (e.g. MIN, MDN, IP address, etc.) 306 for communications recipients to which a subscriber permits pre-provisioned subscriber information to be transmitted with a communications event.

In a preferable embodiment, a contact list 304 may contain emergency service personnel 306b by default. Therefore, subscriber information pre-provisioned for a calling device 302 is always permitted to be transmitted to emergency service personnel (e.g., a Public Safety Answering Point, fire department dispatch personnel, etc.) upon initiation of an emergency communications event (e.g., a 911 call).

Moreover, a subscriber profile 300 may additionally contain a potential location set 308. In accordance with the principles of the present invention, a potential location set 308 includes locations (e.g. an office building, house, vacation home, school, gym, etc.) 310 frequently inhabited by users of a communications device 302. In addition, a potential location set 308 preferably contains a precise address, and any floor number, apartment number, room number, etc 312, relevant to each potential location 310 listed therein.

Further, a subscriber profile 300 may contain a health profile 314. A health profile 314 lists medical conditions 316 and any prescription medicines 318 currently consumed by users of a communications device 302.

Further yet, a subscriber profile 300 may contain an emergency contact list 320. An emergency contact list 320 lists identification credentials 322 for communications recipients that a subscriber wishes to notify upon initiation of an emergency communications event (e.g. a 911 call). In a preferable embodiment, an emergency contact list 320 pre-provisioned for a calling device 302 is automatically furnished to appropriate emergency dispatch personnel with emergency communications events (e.g. a 911 call) initiated by that calling device 302.

Moreover, a subscriber profile 300 preferably contains subscriber preferences 324. Subscriber preferences 324 defined in a subscriber profile 300 place restrictive conditions on stored subscriber information that may be transmitted to a recipient device with a communications event. In particular, a subscriber profile 300 may contain subscriber preferences 324 that permit only certain data 326 defined in a subscriber profile 300 to be furnished to certain communications recipients 306 specified in a communications event. Moreover, subscriber preferences 324 may specify a particular time (e.g. a particular time of day, day of week, etc.) 328 at which a communications system is permitted to furnish certain data defined in a subscriber profile 300 to certain communications recipient devices 306. For instance, a subscriber may define preferences that only permit location information to be furnished to certain recipient devices up to a certain time of day 328 (e.g. a subscriber may not want to share location information with certain communications recipients after 6 pm). Further, a subscriber profile 300 may contain subscriber preferences 324 that only permit location information to be furnished to recipient devices located within a specific geographic area 330 (e.g. a subscriber may only wish to share location information with recipient devices located in a predefined geographic boundary).

The present invention may be extremely valuable to parties (i.e. a calling party and/or a recipient party) engaged in an emergency communications event (e.g. a 911 call).

For instance, the present invention permits a potential location set (i.e. a list of precise potential locations) pre-provisioned for a 911 calling device to be transmitted to emergency dispatch personnel (e.g. a Public Safety Answering Point) with an emergency communications event (e.g. a 911 call). A potential location set received with an emergency communications event permits emergency dispatch personnel to furnish a multiple choice question, e.g., "Are you at home, your vacation house, or work?", to a 911 calling party, regarding a location of a corresponding 911 calling device. A multiple choice question based on a calling party's potential location set may enable emergency dispatch personnel (e.g. a Public Safety Answering Point) to retrieve a higher fidelity location description for a 911 calling device, following verbal verification from a caller. For instance, if a 911 caller answers, e.g. "Yes, I am home.", emergency dispatch personnel may refer to the 911 caller's potential location profile to attain a precise location for the 911 calling device. This ability to retrieve precise location data for a 911 calling device is extremely valuable in the case that a 911 caller is calling, e.g., from a condominium in a large complex, because precise location information defined in a subscriber profile may contain an actual condominium number, floor number, apartment number, etc., that is not obtainable via a latitude/longitude pair conventionally retrieved for a 911 calling device.

For example, when a mobile subscriber places a 911 call via a wireless 911 calling device, that mobile subscriber can reasonably expect location information (e.g. a lat/lon pair) for that 911 calling device to be obtained and routed to emergency dispatch personnel (e.g. a Public Safety Answering Point) with the emergency communications event (i.e. the 911 call). A lat/lon pair obtained for a 911 calling device enables emergency dispatch personnel (e.g. a Public Safety Answering Point) to identify a geographic location for the 911 calling device.

However, if a 911 calling party is located in an apartment building, office building, condominium, etc., a lat/lon pair obtained for a 911 calling device will not enable a 911 call dispatcher to determine a specific floor number, room number, apartment number, etc., in/on which the 911 calling device is located. With the present invention, emergency dispatch personnel may refer to a potential location set received with a 911 communications event, to attain a higher fidelity location description for a 911 calling device, following verbal verification from a caller.

The present invention also permits a health profile pre-provisioned for a 911 calling device to be transmitted to emergency dispatch personnel (e.g. a Public Safety Answering Point) with an emergency communications event (e.g. a 911 call). Emergency dispatch personnel (e.g. a Public Safety Answering Point) may refer to a health profile received with an emergency communications event, to offer a list of options to a 911 calling party regarding a type of assistance that is being requested. More particularly, medical information furnished with a communications event may prompt emergency dispatch personnel (e.g. a Public Safety Answering Point) to furnish a multiple choice question (e.g., "Are you having an asthma attack or experiencing diabetic complications?") to a 911 calling party, to retrieve a higher fidelity emergency description after attaining verbal verification (e.g. "Yes, I am having an asthma attack.") from a caller. Further, in the case that a 911 caller is unable to speak, emergency dispatch personnel (e.g. a Public Safety Answering Point) may say to a caller, e.g., "Press one button on your keypad if you are having an asthma attack or press two buttons on your keypad if you are experiencing diabetic complications". Furnishing a health profile to emergency dispatch personnel with a 911 communications event, permits emergency personnel to arrive at a scene prepared, rather than requiring emergency personnel to assess an emergency situation upon arrival.

The present invention differs from a conventional means of forwarding complementary caller information to a recipient device with a communications event because the present invention provides the ability to determine when caller information is permitted to be transmitted, and what caller information is permitted to be transmitted, based on: communication recipient credentials, subscriber preferences, and any relevant variables, e.g., time of day, location of recipient device, etc.

The present invention may provide a mobile subscriber verified potential location set (e.g. home, office, vacation home) to emergency services and/or commercial entities (e.g., delivery services, marketing services, etc.) with a communications event initiated by that mobile subscriber's mobile device.

The present invention has particular applicability to messaging services, e.g., Short Message Service (SMS), Multimedia Messaging System (MMS), Real-Time Text (RTT), etc. The present invention also has particular applicability to emergency services and/or to commercial services.

While the invention has been describer with reference to the exemplary embodiments thereof, those skilled in the art will be able to make various modifications to the described embodiments of the invention without departing from the true spirit of the invention.

What is claimed is:

1. A method comprising:
   detecting, by a content collection node, a communication session initiated by a given calling wireless device, wherein said communication session comprises a current location of said given calling wireless device and an identification of a recipient called device;
   querying, by said content collection node, a network database to identify a subscriber profile associated with said given caller wireless device, wherein said subscriber profile is associated with a plurality of restrictive conditions;

filtering, by said content collection node, said subscriber profile restricted based on at least one of said plurality of restrictive conditions corresponding to an identity of said recipient called device and a current location of said given calling wireless device; and providing, by said content collection node, said filtered subscriber profile to said recipient called device.

2. The method of claim 1, wherein:
said filtering is further based on a time of day.

3. The method of claim 1, wherein:
said filtering is further based on a current location of said recipient called device.

4. The method of claim 1, wherein:
said subscriber profile includes a health profile of a user of said given calling wireless device associated with at least one of said plurality of restrictive conditions.

5. The method of claim 1, wherein said identity of said recipient called device is identified based on:
an Internet Protocol (IP) address.

6. The method of claim 1, wherein said communication session comprises:
two-way text messaging.

7. The method of claim 1, wherein said communication session comprises:
a Voice over Internet Protocol (VoIP) call.

8. The method of claim 1, wherein said two way text messaging comprises:
short messaging system (SMS) text messaging.

9. The method of claim 1, wherein said communication session comprises:
a multi-media session (MMS).

10. The method of claim 1, wherein said communication session comprises:
real-time text (RTT).

11. The method of claim 1, wherein said plurality of restrictive conditions include levels of access corresponding to a type of emergency responder.

12. The method of claim 11, wherein said type of emergency responder is determined based on said recipient called device.

13. A system comprising:
a subscriber information database comprising a subscriber profile associated with said given caller wireless device, wherein said subscriber profile is associated with a plurality of restrictive conditions; and
a content collection node to:
  detect a communication session initiated by a given calling wireless device, wherein said communication session comprises a current location of said given calling wireless device and an identification of a recipient called device;
  query a network database to identify said subscriber profile associated with said given caller wireless device;
  filter said subscriber profile restricted based on at least one of said plurality of restrictive conditions corresponding to an identity of said recipient called device and a current location of said given calling wireless device; and
  provide said filtered subscriber profile to said recipient called device.

14. The system of claim 13, wherein said plurality of restrictive conditions include levels of access corresponding to a type of emergency responder.

15. The system of claim 14, wherein said type of emergency responder is determined based on said recipient called device.

16. The system of claim 13, wherein:
said filtering is further based on a time of day.

17. The system 13, wherein:
said filtering is further based on a current location of said recipient called device.

18. The system 13, wherein:
said subscriber profile includes a health profile of a user of said given calling wireless device associated with at least one of said plurality of restrictive conditions.

19. The system of claim 13, wherein the subscriber profile comprises location information for a subscriber and medical history information for said subscriber.

* * * * *